Feb. 26, 1952   C. E. ORRISON   2,586,986
HAND SUPPORT FOR AUTOMOBILES
Filed Sept. 21, 1949                                    2 SHEETS—SHEET 1

INVENTOR.
Chester E. Orrison
BY
ATTORNEY.

Feb. 26, 1952     C. E. ORRISON     2,586,986
HAND SUPPORT FOR AUTOMOBILES
Filed Sept. 21, 1949     2 SHEETS—SHEET 2
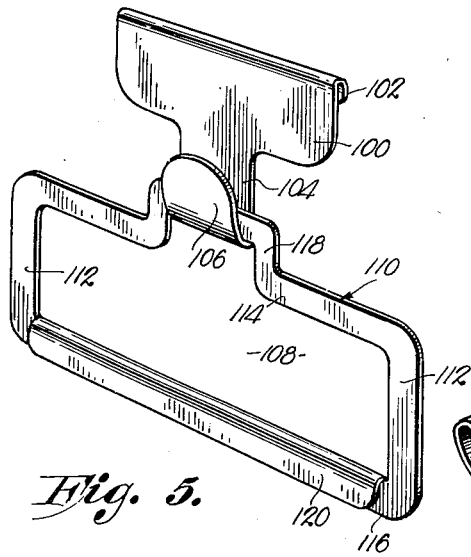
Fig. 5.
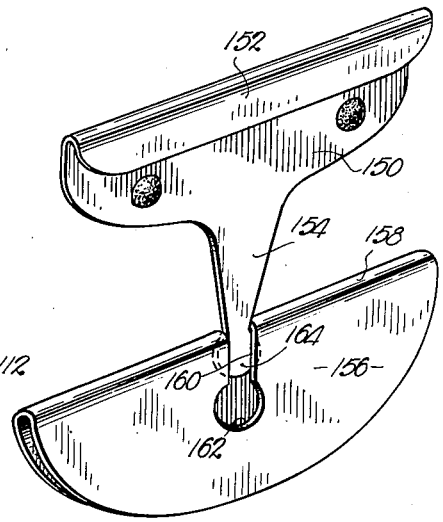
Fig. 6.
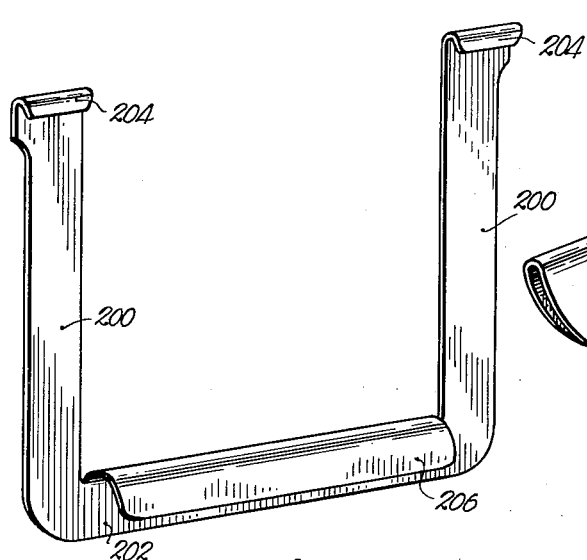
Fig. 8.
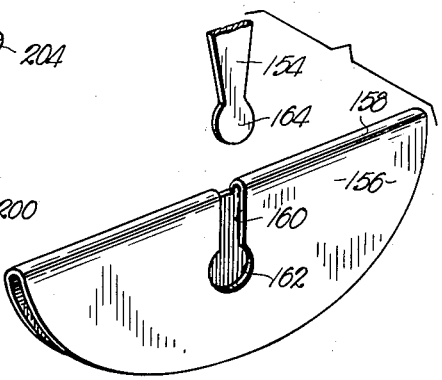
Fig. 7.
INVENTOR.
Chester E. Orrison
BY
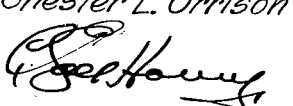
ATTORNEY.

Patented Feb. 26, 1952

2,586,986

UNITED STATES PATENT OFFICE 2,586,986

HAND SUPPORT FOR AUTOMOBILES

Chester E. Orrison, Springfield, Mo.

Application September 21, 1949, Serial No. 116,929

5 Claims. (Cl. 105—354)

This invention relates to automobile accessories in the nature of an attachable item adapted for releasable connection to a part of an automobile adjacent one of the windows thereof and formed and arranged to serve as a hand support for one of the occupants thereof.

Automobile users are well aware of the fact that from the standpoint of comfort, there is a need for a support for the hands and arms. It is presently the practice to lay one forearm upon the lower rail of the proximal window; to rest an elbow upon such rail; to grasp certain of the framework forming a part of such window; or more often, to grasp the water channel or gutter that extends above the windows adjacent the lowermost edge of the automobile top. Such practices are of little comfort and on long drives particularly, the occupant becomes weary if for no other reason because of the fact that there is no convenient support for the arms and hands.

Accordingly, it is the most important object of the present invention to provide a hand support adapted for hooking either along the uppermost edge of a window or door or in the aforesaid water channel and extending downwardly below the uppermost window rail, the support having comfortable means to be grasped by an occupant's hand and thereby afford comfort and rest.

Another important object of the present invention is to provide a hand support for automobiles having a plurality of elements thereon that may be grasped by an occupant's hand whereby he may change positions from time to time and thereby relieve the tiresome effects of driving.

Other important objects of the present invention relate to the way in which the hand support forming the subject matter hereof may be made in a plurality of differing forms, all depending upon the desires of the manufacturer or user, together with many minor objects, all of which will be made clear or become apparent as the following specification progresses.

In the drawing:

Fig. 5 is a perspective view showing another modification of the hand support.

Fig. 6 is a perspective view showing a third modified form of the support.

Fig. 7 is a fragmentary, stretched-out view of the modification shown in Fig. 6 with the parts thereof separated; and Fig. 8 is a perspective view of another hand support made in accordance with my present invention.

Figure 1:
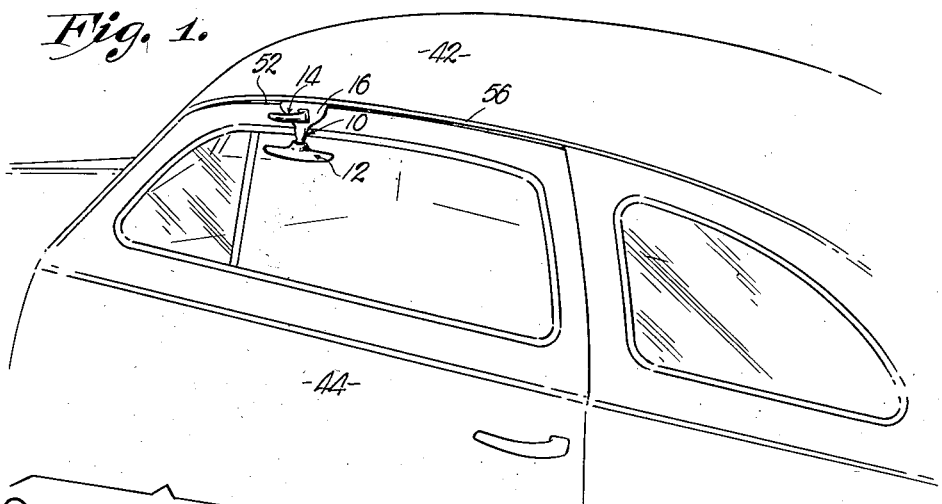
Fig. 1 is a perspective view of a hand support showing the same operably mounted upon an automobile.
Figure 2:
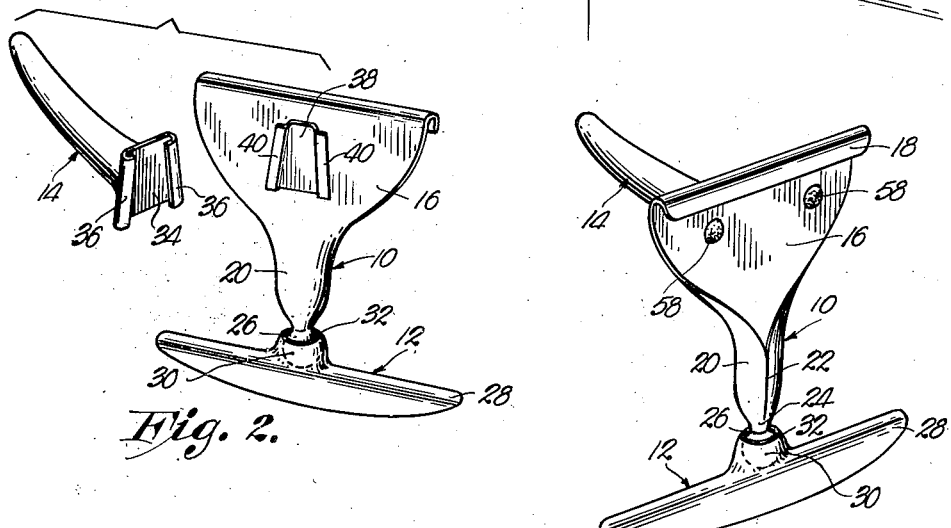
Fig. 2 is a perspective stretched-out view showing the form of my invention illustrated in Fig. 1 with one of the hand supports thereof removed.
Figure 3:
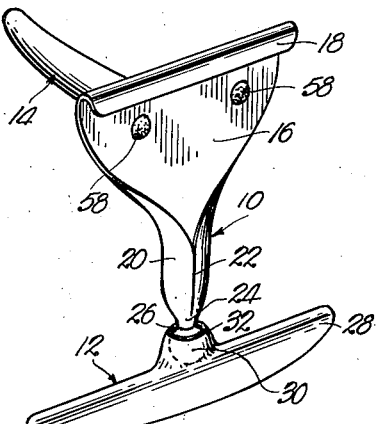
Fig. 3 is a perspective view thereof showing the innermost face of the support.

The form of my invention illustrated in Figs. 1 to 4 inclusive constitutes three parts designated by the numerals 10, 12 and 14 respectively, all made in the interest of inexpensiveness from an initially flat sheet of relatively strong, rigid sheet material that is readily bendable to the shapes illustrated and capable of retaining such contour after complete fabrication.

The member 10 includes a flat, substantially heart-shaped portion 16 having the lowermost end thereof rebent inwardly into an elongated stem 20 having the longitudinal marginal edges thereof bent laterally and inwardly toward each other and into abutting relationship at 22, rendering stem 20 tubular throughout substantially its entire length. The lowermost end of the stem 20 is of reduced diameter as at 24 and carries thereon a spherical part 26 forming a part of a ball and socket joint for receiving the member 12.

Member 12 is elongated and formed from a flat sheet of material as aforesaid with the ends thereof tapered as at 28. In forming the member 12, the flat sheet of material is bent along a median longitudinal line to render the same arcuate in transverse cross-section.

A boss 30 is spun or otherwise formed on the uppermost edge of the member 12 intermediate the ends thereof, said boss 30 being hollow and provided with an open top 32 for receiving the ball 26. The inside diameter of the boss 30 is substantially the same as the outside diameter of the ball 26 but the opening 32 is of less diameter than the ball 26 to the end that member 12 is permanently attached to the stem 20.

The member 14 is formed in much the same manner as the member 12 in that the same is elongated and transversely arched. It is desirable also that the member 14 be slightly arcuate longitudinally as illustrated in Figs. 1 to 4 inclusive.

One end of the member 14 is provided with a plate 34 having the vertical longitudinal edges rebent toward each other to present a pair of U-shaped hooks 36. Hooks 36 converge as the uppermost ends thereof are approached and are adapted to be fitted over a bracket 38 formed on the normally outermost face of the portion 16 of member 10.

Bracket 38 constitutes a flat plate having the vertical longitudinal edges thereof bent in offset relationship to the plane of plate 38 to present a pair of opposed flanges 40 that converge as the uppermost ends thereof are approached in the same manner as the hooks 36. Thus the bracket 38 receives the end piece 34 of member 14 in the conventional manner. The connecting parts 34 and 38 for releasably mounting the member 14 to the flat plate-like portion 16, may be secured in any suitable manner such as welding or by the use of solder. It is contemplated also that the flanges 40 may be formed by stamping the same from the material forming the section 16 of the device.

Figure 4:
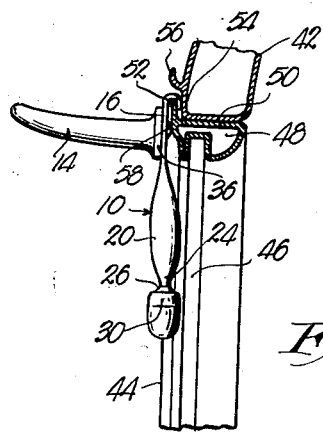
Fig. 4 is a vertical sectional view through the door of the automobile shown in Fig. 1, illustrating one edge elevational view of the hand support.

In operation, the hand support shown in Figs. 1 to 4 inclusive is mounted on an automobile 42 in the manner illustrated in Figs. 1 and 4. Such automobiles are provided with doors 44 having windowpanes 46 mounted within a frame that includes an uppermost rail 48. Such rail 48 has a top plate 50 that is L-shaped, presenting an up-turned flange 52 that overlaps the lowermost marginal edge 54 of the top immediately below a water channel or gutter 56.

As is clear in Fig. 4, the hook 18 of the member 16 is looped over the uppermost edge of the flange 52 of rail 48 in any desired position along the length of the latter with the stem 20 extending downwardly below the rail 48. It is thus seen that an occupant of the automobile may grasp the support on the cross-bar 12 or over the laterally-extending grip 14. The rounded surfaces of these two gripping members add comfort to the hand of the user and through the use of a number of differing grips he may change positions from time to time as desired.

The user may grasp the cross-bar 12 either in its entirety with two of his fingers embracing the portion 24 of stem 20, or he may grip the bar 12 at either of its ends to one side of the ball and socket connection 26—30. Furthermore, because of the fact that the bar 12 is freely rotatable on the stem 20, the operator may swing such bar 12 to a convenient relaxing position. Inasmuch as the hand grip 14 is entirely removable from the member 16, the same can be used only if desired and be normally carried in the automobile glove compartment until use as needed or desired. Also, members 14 and 38 may be eliminated entirely, if desired.

A pair of resilient bumpers 58 on the innermost face of the member 16 bears against the outermost face of flange 52 to prevent marring of the finish thereof.

A relatively tight grip between the hook 18 and the flange 52 is desired, to the end that the device will not readily become disengaged from the door 44. It is seen in Fig. 4 that the hand grip will not in any way interfere with the raising and lowering of the glass pane 46 and that the device need not be removed unless desired. The hook 18 permits ready dismounting, however, and the user may well carry the entire device within the car until use is to be made thereof.

The modification illustrated in Fig. 5 of the drawings is like that just above described in that the same is made from an initially flat sheet of material which renders the same inexpensive and easily manufactured.

The form of Fig. 5 is also like that of Figs. 1 to 4 inclusive in that a flat supporting member 100 has the uppermost edge thereof rebent into an elongated U-shape hook 102 to be received by a flange 52 of an automobile door. The lowermost edge of the flat member 100 has an elongated stem 104 integral therewith and depending downwardly, said stem 104 terminating at its lowermost end in a loop 106 disposed oppositely to the hook 102.

A polygonal, preferably rectangular, frame 108 constitutes a continuous band 110 having a pair of end bars 112, an uppermost stretch 114, and a bottom rail 116. The uppermost rail 114 has an outwardly extending offset portion 118 adapted to be received by the loop 106 and the bottom rail 116 has its innermost longitudinal edge rebent outwardly as at 120. The rebent portion 120 presents a comfortable hand grip for the user who extends his fingers through the frame 108 when this hand support is placed in use. The distance between the up-standing ends 112 should be sufficiently great to permit easy insertion of the hand of the user into the frame 108. It is seen that the member 100 may be left on the automobile at all times in hooked relationship to the window rail and inasmuch as the frame 108 is readily removable from the loop 106, the same may be normally stored within the automobile when not in use.

The modified form of my device illustrated in Figs. 6 and 7 is much like that of Figs. 1 to 4 inclusive in that a plate 150 is provided with a hook 152 at the uppermost longitudinal edge thereof and a downwardly extending, elongated stem 154 integral with the lowermost edge of the plate 150 intermediate the ends thereof.

A hand grip 156 differs however from the hand grip 12 of Figs. 1 to 4 inclusive in that the same is removably secured to the stem 154. Hand grip 156 is initially flat and substantially circular and is rebent upon itself as at 158 along a diameter to present a rounded uppermost surface for receiving the hand of the user. Hand grip 156 is accordingly semi-circular and one of the sections thereof is provided with an elongated slot 160 that traverses the rounded uppermost edge 158 as shown in Fig. 7 and extends downwardly into an enlarged circular portion 162.

It is noted that the longitudinal edges of the stem 154 converge as the lowermost end thereof is approached and that such end is provided with an enlarged circular disc 164. The diameter of the disc 164 is slightly less than the diameter of the enlarged circular opening 162 and the width of the stem 154 at the point of merger with disc 164 is substantially the same as the width of the notch 160 above opening 162. Accordingly, the grip 156 is mounted upon the stem 154 by aligning the disc 164 with the opening 162 and permitting the grip 156 to move downwardly where a portion of the innermost face of rounded edge 158 rests upon the edges of disc 164 adjacent stem 154. Thus, in the form of my invention shown in Figs. 6 and 7, the hand grip 156 serves much the same function as the hand grip 12 of Figs. 1 to 4 inclusive but is removable in the same manner as the support shown in Fig. 5 for normal storage within the automobile while the plate 150 remains affixed to the window rail of the automobile.

The form of my invention shown in Fig. 8 of the drawing, is U-shaped, presenting a pair of elongated, substantially parallel legs 200 interconnected by an elongated bight portion 202. The uppermost free ends of the legs 200 are provided with hooks 204 adapted to be received by a flange such as illustrated at 52 in Fig. 4 and the bight 202 has a laterally extending lip 206 presenting a rounded uppermost edge for receiving the hand of the user. Lip 206 is essentially the same as the lip or hook portion 120 shown in Fig. 5.

The legs 200 of course, depend downwardly from the uppermost rail 48 where the lip 206 is presented to the user as a means for supporting his hand.

While it has been explained that the various modifications hereof are mounted upon the flange 52 of door 48, it is of course, apparent that the various uppermost hooks shown in the devices might well be looped over the gutter 56 if desired and such operation is particularly adaptable with respect to the modified form of Fig. 8 because of the fact that the elongated legs 200 might well be bent inwardly at a point adjacent the lowermost edge of rail 48 to dispose grip portion 206 in underlying relationship to rail 48. The disadvantage however, of mounting the devices on the rain trough 56 is obviously that of interfering with the free opening of door 44 and forcing the removal of the hand support each time such door is opened and closed.

It is also apparent that the handle 14 shown in the modified form of Figs. 1 to 4 inclusive, may be eliminated entirely if desired, or may be readily adapted for use in connection with the plates 100 and 150 in Figs. 5 and 6 respectively. Furthermore, the removable hand grips 108 or 156 in Figs. 5 and 6, may be substituted for the grip 12 in Figs. 1 to 4, inclusive, and conversely, a ball and socket joint could well be provided for the frame 108 and stem 104 as well as for the hand grip 156 and its stem 154.

It is noteworthy that when the hand support forming the subject matter of the present invention is placed in use, a safety factor is involved in that the user's arm and elbow are substantially within the automobile and not extended outwardly to a point where sideswiping might cause injury. Such is particularly true when the user permits his elbow and forearm to hang naturally within the automobile rather than in a rested relationship on the lowermost rail of the window frame.

Having thus described the invention, what is claimed as new and desired to be secured by Letters Patent is:

1. For automobiles having a body provided with a window frame and an upstanding flange adjacent the uppermost edge of the window frame, a hand support comprising an elongated, plate-like, relatively rigid member having an internal hook on one end thereof adapted for looped engagement with said flange, said member depending from the flange when mounted thereon; and a cross-bar mounted on the opposite end of said member, presenting a handle for grasping by an occupant of said automobile.

2. For automobiles having a body provided with a window frame and an upstanding flange adjacent the uppermost edge of the window frame, a hand support comprising an elongated, plate-like, relatively rigid member having an internal hook on one end thereof adapted for looped engagement with said flange, said member depending from the flange when mounted thereon; and a cross-bar pivotally mounted on the opposite end of said member for free swinging movement on a vertical axis and presenting a handle for grasping by an occupant of said automobile.

3. For automobiles having a body provided with a window frame and an upstanding flange adjacent the uppermost edge of the window frame, a hand support comprising an elongated, plate-like, relatively rigid member having an internal hook on one end thereof adapted for looped engagement with said flange, said member depending from the flange when mounted thereon; a tubular hand grasp at the opposite end of member; a hand-receiving cross-bar; and a ball and socket, pivotal connection between the tubular hand grasp and the cross-bar.

4. For automobiles having a body provided with a window frame and an upstanding flange adjacent the uppermost edge of the window frame, a hand support comprising an elongated, plate-like, relatively rigid member having an internal hook on one end thereof adapted for looped engagement with said flange, said member depending from the flange when mounted thereon; and a continuous frame having a bar mounted on the opposite end of said member and a second bar presenting a handle for grasping by an occupant of said automobile.

5. For automobiles having a body provided with a window frame and an upstanding flange adjacent the uppermost edge of the window frame, a hand support comprising an elongated, plate-like, relatively rigid member having an internal hook on one end thereof adapted for looped engagement with said flange, said member depending from the flange when mounted thereon; a stem forming a part of said member at the opposite end thereof; and a cross-bar provided with a slot, said stem having means thereon extending into said slot and interlocked with the cross-bar for mounting the latter on the stem.

CHESTER E. ORRISON.

REFERENCES CITED

The following references are of record in the file of this patent:

UNITED STATES PATENTS

| Number | Name | Date |
|---|---|---|
| 1,874,881 | Brown | Aug. 30, 1932 |
| 2,081,291 | Creamer | May 25, 1937 |
| 2,091,489 | Prance | Aug. 31, 1937 |
| 2,163,106 | Schmidt | June 20, 1939 |
| 2,194,461 | Lilley | Mar. 26, 1940 |

FOREIGN PATENTS

| Number | Country | Date |
|---|---|---|
| 398,734 | France | Mar. 31, 1909 |